United States Patent
During et al.

(10) Patent No.: US 9,051,996 B2
(45) Date of Patent: Jun. 9, 2015

(54) PLANETARY GEAR UNIT

(75) Inventors: Tom-Michel During, Erlangen (DE); Ramon Jurjanz, Erlangen (DE); Philip Wurzberger, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/131,249

(22) PCT Filed: May 7, 2012

(86) PCT No.: PCT/EP2012/058336
§ 371 (c)(1),
(2), (4) Date: Mar. 21, 2014

(87) PCT Pub. No.: WO2013/004415
PCT Pub. Date: Jan. 10, 2013

(65) Prior Publication Data
US 2014/0194245 A1    Jul. 10, 2014

(30) Foreign Application Priority Data
Jul. 7, 2011   (DE) .................. 10 2011 078 775

(51) Int. Cl.
| | |
|---|---|
| F16H 3/44 | (2006.01) |
| F16H 3/62 | (2006.01) |
| F16H 37/06 | (2006.01) |
| F16H 1/46 | (2006.01) |
| F16H 48/36 | (2012.01) |
| F16H 57/08 | (2006.01) |
| F16H 48/42 | (2012.01) |
| F16C 19/18 | (2006.01) |
| F16H 48/10 | (2012.01) |
| F16H 48/11 | (2012.01) |

(52) U.S. Cl.
CPC ............ *F16H 1/46* (2013.01); *F16H 2048/426* (2013.01); *F16C 19/182* (2013.01); *F16H 48/10* (2013.01); *F16H 48/36* (2013.01); *F16H 57/08* (2013.01); *F16H 2048/368* (2013.01); *F16H 48/11* (2013.01)

(58) Field of Classification Search
None
See application file for complete search history.

(56) References Cited

U.S. PATENT DOCUMENTS

| | | | | |
|---|---|---|---|---|
| 5,525,117 A | * | 6/1996 | Morisawa et al. | 475/281 |
| 5,769,751 A | * | 6/1998 | Forster | 475/346 |
| 6,120,407 A | * | 9/2000 | Mimura | 475/225 |
| 8,529,396 B1 | * | 9/2013 | Vernon et al. | 475/296 |

FOREIGN PATENT DOCUMENTS

| | | |
|---|---|---|
| DE | 102008056622 A1 | 5/2010 |
| GB | 1559492 A | 1/1980 |
| JP | 2006283876 A | 10/2006 |

* cited by examiner

*Primary Examiner* — Justin Holmes
*Assistant Examiner* — Timothy Hannon
(74) *Attorney, Agent, or Firm* — Simpson & Simpson, PLLC

(57) ABSTRACT

A planetary gear unit, having at least one first set of first planetary wheels arranged at a radial distance to a central axis, which mesh with a first sun gear that is rotatable around the central axis. The planetary gear unit further includes at least one second set of second planetary wheels arranged at a radial distance to the central axis, where the second planetary wheels mesh with a second sun gear that is rotatable around the central axis.

1 Claim, 2 Drawing Sheets

PLANETARY GEAR UNIT

CROSS-REFERENCE TO RELATED APPLICATIONS

The present application is the U.S. national stage application pursuant to 35 U.S.C. §371 of International Application No. PCT/EP2012/058336, filed May 7, 2012, which application claims priority of German Application No. 10 2011 078 775.5, filed Jul. 7, 2011.

FIELD OF THE INVENTION

The invention relates to a planetary gear unit having at least one first set of first planet gears, which are arranged at a radial distance from a central axis and which are in mesh with a first sun gear, which can be rotated about the central axis, and having at least one second set of second planet gears, which are arranged at a radial distance from the central axis, where the second planet gears are in mesh with a second sun gear that can be rotated about the central axis.

BACKGROUND OF THE INVENTION

German Patent Application No. 10 2008 056 622 A1 shows a transfer case for distributing the torque by way of a differential to a first drive shaft and a second drive shaft. The distribution of the torque can be controlled in the transfer case by means of an auxiliary gear arrangement and automatically controllable brakes. For this purpose the transfer case has a planetary gear unit consisting of two so-called timing gears that are coupled to each other and that can be automatically controlled by means of brakes.

The planetary gear unit is coupled to a planetary stage by means of two of its shafts and is formed by a planet carrier, a set of first planet gears, a set of second planet gears, a ring gear, and a first sun gear and a second sun gear. Each first planet gear, referred to as the long planet gear, sits on a respective first planet pin, which is stationary on the planet carrier. Each second planet gear, referred to as the short planet gear, sits on a respective second planet pin, which is also stationary on the planet carrier. Each long planet gear is in mesh with a respective short planet gear and with the first sun gear. Each short planet gear is in mesh with the second sun gear. The sun gears are connected to the controllable brakes.

The planet gears and the sun gears have beveled teeth. Therefore, when torque is transferred in the course of meshing, not only are tangential and radial components of the tooth forces generated, but also axial components that are absorbed by the surrounding environment. Usually the sun gears are supported axially on friction surfaces against these forces. The friction consumes energy that is desirable in differentials on account of a certain degree of self-locking, but is undesired in timing gears. Such arrangements should move smoothly and exhibit low energy losses due to internal friction.

BRIEF SUMMARY OF THE INVENTION

The object of the invention is to provide a smoothly moving planetary gear unit.

In an embodiment, one of the sun gears of the planetary gear unit that is designed with at least two sun gears, which are arranged coaxially to each other, is mounted in the planetary gear unit by means of at least one angular ball bearing in such a way that the at least one sun gear can be rotated about the central axis. The angular ball bearing is arranged in such a way that the axial components resulting from the tooth forces of the beveled tooth planet gears and the sun gear are absorbed by the angular ball bearing and transmitted to the surrounding structure. The angular ball bearing has a comparatively small installation space requirement compared to a combination consisting of an axial bearing and a radial bearing, with which the sun gear could be supported and can absorb higher axial forces than a radial deep-groove ball bearing.

Radial ball bearings can be loaded essentially in the radial direction. Therefore, the contact lines, which are laid by the balls making contact with the outer ball race and with the inner ball race as well as by the respective ball center of the balls of the ball bearing, lie in a radial plane that is vertically intersected by the rotational axis of the ball bearing. Axial ball bearings can be loaded essentially in the radial direction. The contact lines, which are laid by the balls making contact with the two axial ball races and by the respective ball center of the ball bearing, run axially parallel to the rotational axis of the axial ball bearing. In the case of angular ball bearings the contact line, which is laid by the respective balls making contact with the outer ball race and with the inner ball race as well as by the respective ball center of the respective balls, slopes towards the radial plane and the plane of rotation. The angle (referred to as the contact angle), which the respective contact line and the radial plane or the contact line and the axis of rotation enclose between themselves, ranges between 20° and 45°. As a result, not only high axial forces but also high radial forces can be absorbed by the angular ball bearing.

Those skilled in the art are guided by the assumption that angular ball bearings can only be installed together in pairs, because they have to be tightened relative to each other in the axial direction. At the same time a distinction is made between an X arrangement (i.e. face-to-face arrangement) and an O arrangement (i.e. back-to-back arrangement). In the X arrangement the contact lines of both ball bearings intersect the common axis of rotation between the bearing points with the angular ball bearings, on the part of the side of the respective angular ball bearing, where the side faces the other angular ball bearing. In the O arrangement the contact lines of the angular ball bearings usually intersect the common axis of rotation on the left or the right on the side facing the other angular ball bearing. In an arrangement, the axially oriented central axis of the planetary gear unit or more specifically the differential is simultaneously the rotational axis of the sun gears and the angular ball bearings.

One embodiment of the invention provides that each of the sun gears is rotatably mounted with one angular ball bearing. According to the invention, the angular ball bearings are not axially preloaded against each other when the planetary gear unit is at rest. Not until in operation under load do the axial components, resulting from meshing with the first planet gears, act on the sun gears in such a way that these sun gears preload the angular ball bearings, because the axial force components, applied to a sun gear, are directed in the opposite direction of the force components acting on the other sun gear. When the planetary drive is in operation, the respective angular ball bearing that is in close proximity to the sun gear is also supported axially on the surrounding area.

One embodiment of the invention provides that either the first planet gears or the second planet gears are home by a planet carrier at a radial distance from the central axis in such a way that the gears can be rotated about their own axis of rotation. An additional embodiment of the invention provides that both sets are borne by one common planet carrier. At least one of the sun gears, for example, the first sun gear that is in mesh with the long planet gears, is mounted on the planet carrier by means of the angular ball bearing.

The planetary gear unit can include, for example a planet carrier that is formed by two sections that are axially spaced apart from each other and are connected to each other. The planet gears and the sun gears are arranged axially between the sections. In this case, it is conceivable that each of the sun gears is mounted on one of the sections of the planet carrier by means of an angular ball bearing. The axial components of the tooth forces are directed accordingly into the planet carrier.

An additional embodiment of the invention provides that at least one set of planet gears is borne by a planet carrier that is mounted in a manner allowing rotation about the central axis relative to an additional connecting shaft. The sun gear that is in mesh with this set is mounted on the connecting shaft in such a way that the sun gear can rotate about the central axis. The connecting shaft can be a ring gear or the other sun gear of the planetary drive, but as an alternative, also a connecting shaft of another planetary drive.

One embodiment of the invention provides a differential assembly, which has at least one differential and the planetary gear unit according to the invention. The differential allows the torque, which is applied to a sum shaft (i.e. the drive shaft) of the differential, to be distributed to a first output shaft and a second output shaft by means of the compensating gears of the differential, where the compensating gears can be rotated relative to each other. The differential is either a bevel gear differential with compensating bevel gears or a planetary differential with compensating planet gears. At least one set of planet gears is borne by a planet carrier, which is mounted in such a way that it can be rotated about the central axis relative to an additional connecting shaft. The sun gear, which is in mesh with the set on the planet carrier, is mounted on a connecting shaft (for example, on the sum shaft) of the differential in a manner allowing rotation about the central axis, wherein the differential connecting shaft can be rotated about the central axis.

Sum shafts are those connecting shafts of planetary gear units that convey the highest torque. Connecting shafts are drive shafts and output shafts or fixed elements. Shafts are those elements of the planetary drive that can be rotated about the central axis of the planetary drive or can be slowed down or more specifically can be secured in such a way that they are rotationally rigid relative to the central axis; or the shafts are elements that are fixed like fixed elements.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
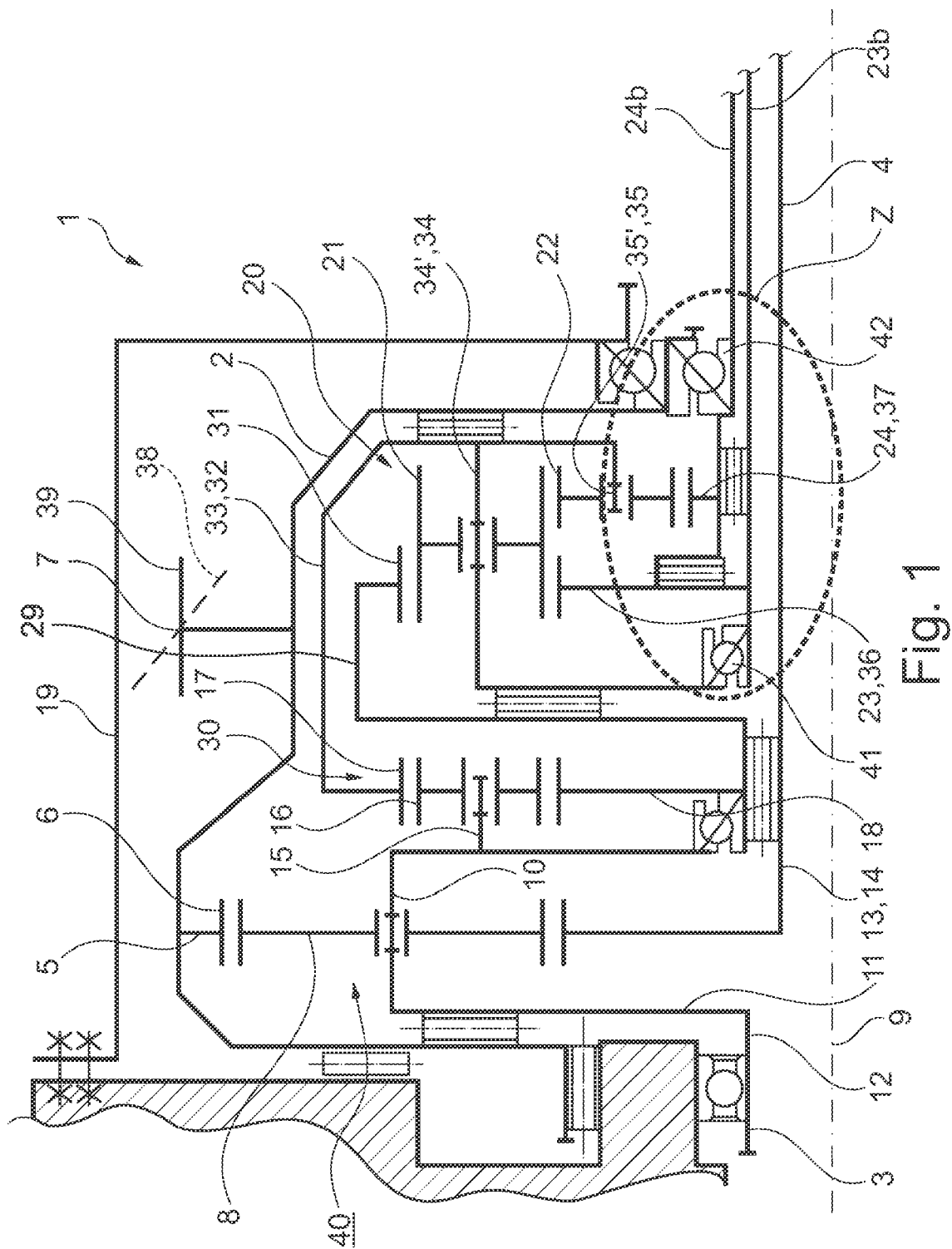
FIG. 1 shows in schematic form half of a differential assembly, which is cut along its central axis. The torque of the differential assembly is split between two output shafts by a sum shaft; and, FIG. 2 shows the detail Z from FIG. 1 on an enlarged scale, but not drawn to scale.

Differential 40 of differential assembly 1 includes, as a connecting shaft, sum shaft 2, planet gears 8 on planet carrier 11 and sun gear 13.

Sum shaft 2 is ring gear 5, which is designed in the manner of a housing and can be rotated about central axis 9 relative to housing 19. The ring gear has internal teeth 6, on which gear 7 sits. Gear 7 can be bevel gear 38 of an angle drive or spur gear 39 with beveled teeth. Inner teeth 6 are in mesh with a set of planet gears 8, of which one only is depicted in the figure. Each of planet gears 8 is rotatably mounted on planet pins 10 of planet carrier 11.

Planet carrier 11 is first connecting shaft 12 of differential assembly 1 that is operatively connected to output shaft 3; and the first connecting shaft can be rotated about central axis 9. Rotatable sun gear 13 having an axis of rotation that corresponds to central axis 9 is in mesh with planet gears 8 and is second connecting shaft 14 that is operatively connected to output shaft 4.

Planet carrier 11 carries rotatably on planet pins 15 planet gear 16 of additional set of planet gears 16 of planetary drive 30, of which only one is depicted in the figure. Planet gears 16 are in mesh with ring gear 17 and with sun gear 18 of planetary drive 30. The rotational axes of ring gear 17 and sun gear 18 correspond to central axis 9.

Figure 2:
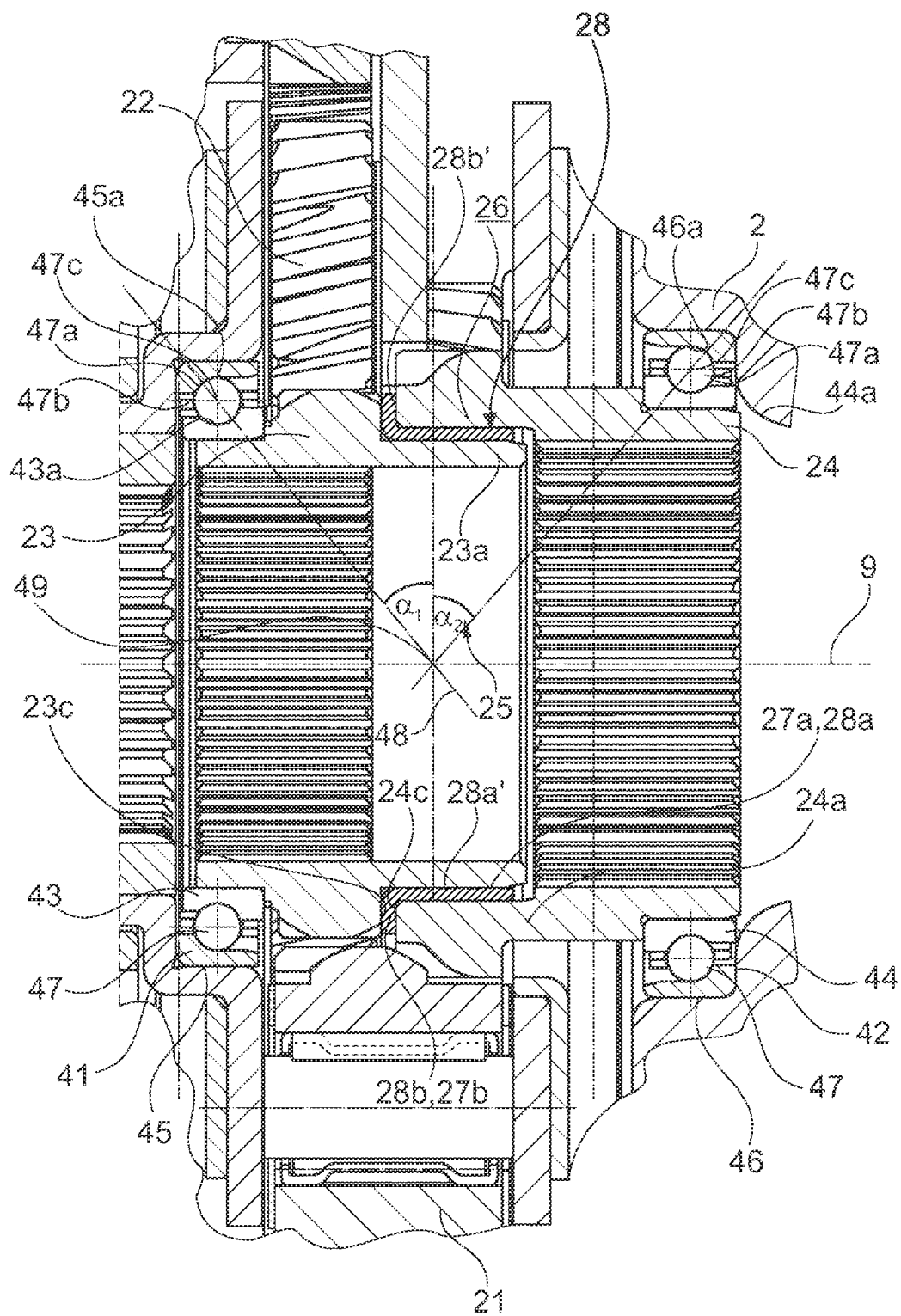

FIG. 2 shows the detail Z from FIG. 1 on an enlarged scale, but not drawn to scale. In this case the individual elements are shown in a longitudinal sectional view along central axis 9. Differential assembly 1 includes planetary gear unit 20 having at least one first set of long first planet gears 21, which are arranged at a radial distance from central axis 9. Of these planet gears, only one is shown in the drawing; and it is in mesh with first sun gear 23 that can be rotated about central axis 9. In addition, planetary gear unit 20 is provided with at least one second set of short second planet gears 22, which are arranged at a radial distance from central axis 9 and which are in mesh with second sun gear 24, which can be rotated about central axis 9. First planet gears 21 are mounted in each instance on first planet pin 34 in such a way that they can be rotated about respective axis of rotation 34'. Second planet gears 22 are mounted on second planet pins 35 in such a way that they can be rotated about respective axis of rotation 35'. In addition, each second planet gear 22 is also in mesh with first planet gear 21.

Connecting shaft 29 of planetary gear unit 20 to sun gear 18 of planetary drive 30 is ring gear 31, which is in mesh with first planet gears 21. Connecting shaft 32 to ring gear 17 of planetary drive 30 is planet carrier 33 of planetary gear unit 20, to which planet pins 34 and 35 are attached. Additional connecting shafts 36 and 37 are sun gears 23 and 24, which are provided in each instance with shaft 23b and 24b respectively. Both shafts 23b and 24b extend in the figure to the right to brakes that are not depicted. For this purpose, shaft 24b is configured so as to be hollow; and shaft 23b is inserted concentrically in the former shaft. Shaft 23b is also designed as a hollow shaft, by means of which output shaft 4 is moved concentrically.

Sun gears 23 and 24, which are aligned coaxially to each other, can be supported on one another in the radial and axial direction at bearing point 26 in overlapping region 25. In overlapping region 25 external cylindrical section 23a of first sun gear 23 sits in internal cylindrical section 24a of second sun gear 24 in such a way that they are separated from each other by radial annular gap 27a. Axial annular gap 27b is formed between the axially directed end faces 23c and 24c of respective sun gears 23 and 24. Bearing point 26 has combined axial/radial bearing 28, which fills annular gap 27a and 27b, in such a way that sun gears 23 and 24 are supported on one another in the axial and radial direction. Radial component 28a of axial/radial bearing 28 is floating bushing 28a'; and axial component 28b is slip washer 28b'. Floating bushing 28a' and slip washer 28b' are formed in a materially integral fashion, so that slip washer 28b' forms a collar that projects radially outwards from floating bushing 28a'.

Sun gear 24 of planetary gear unit 20 is mounted on sum shaft 2 of differential 40 in such a way that it can be rotated about central axis 9 relative to sum shaft 2. Sun gear 23 is mounted on planet carrier 33 in such a way that it can be rotated about central axis 9 relative to planet carrier 33.

Sun gears 23 and 24 are mounted with angular ball bearings 41 and 42 having axes of rotation that correspond to those of sun gears 23 and 24. Hence, the angular ball bearings lie axially parallel on central axis 9.

Each of angular ball bearings 41 and 42 include balls 47 and inner ring 43 and 44 respectively with outer ball race 43a and 44a respectively. In addition, inner ball race 45a and 46a respectively is formed on outer ring 45 and 46 respectively. Angular ball hearings 23 and 24 are placed opposite each other in X arrangement and are not preloaded against each other when differential gear unit 1 is not running. For the X arrangement contact lines 48, laid in the section plane of FIG. 2 by means of contacts 47a and 47b and by means of ball center 47c of respective ball 47, are aligned in such a way that they cut central axis 9 axially between the two bearing points with angular ball hearings 23 and 24. In so doing, contact lines 48 and radial plane 49, which is laid by means of intersecting point 49 of contact lines 48 and is intersected vertically by the central axis, enclose a contact angle $a_1$ and $a_2$ respectively between themselves.

Planet gears 21 and 22 have beveled teeth, which correspond to the beveled teeth on ring gear 31 and on sun gears 23 and 24. During normal operation, the tooth forces of the meshing teeth are divided into radial and axial components, which are absorbed by angular ball bearings 41 and 42. At the same time during normal operation angular ball bearings 41 and 42 are axially preloaded by the opposite axial tooth forces resulting at sun gears 23 and 24.

| List of Reference Numerals | |
| --- | --- |
| 1 | differential assembly |
| 2 | sum shaft |
| 3 | output shaft |
| 4 | output shaft |
| 5 | ring gear |
| 6 | inner teeth |
| 7 | gear |
| 8 | planet gear |
| 9 | central axis |
| 10 | planet pin |
| 11 | planet carrier |
| 12 | first connecting shaft |
| 13 | sun gear |
| 14 | second connecting shaft |
| 15 | planet pin |
| 16 | planet gear |
| 17 | ring gear |
| 18 | sun gear |
| 19 | housing |
| 20 | planetary gear unit |
| 21 | first planet gear |
| 22 | second planet gear |
| 23 | first sun gear |
| 23a | external cylindrical section |
| 23b | shaft |
| 23c | end face |
| 24 | second sun gear |
| 24a | internal cylindrical section |
| 24b | shaft |
| 24c | end face |
| 25 | overlapping region |
| 26 | bearing point |
| 27a | radial annular gap |
| 27b | axial annular gap |
| 28 | combined axial/radial bearing |
| 28a | radial component |
| 28a' | floating bushing |
| 28b | axial component |
| 28b' | slip washer |

-continued

| List of Reference Numerals | |
| --- | --- |
| 29 | connecting shaft |
| 30 | planetary drive |
| 31 | ring gear |
| 32 | connectin shaft |
| 33 | planet carrier |
| 34 | planet pin |
| 34' | axis of rotation |
| 35 | planet pin |
| 35' | axis of rotation |
| 36 | connecting shaft |
| 37 | connecting shaft |
| 38 | bevel gear |
| 39 | spur gear with beveled teeth |
| 40 | differential |
| 41 | angular ball bearing |
| 42 | angular ball bearing |
| 43 | inner ring |
| 43a | outer ball race |
| 44 | inner ring |
| 44a | outer ball race |
| 45 | outer ring |
| 45a | inner ball race |
| 46 | outer ring |
| 46a | inner ball race |
| 47 | ball |
| 47a | contact |
| 47b | contact |
| 47c | ball center |
| 48 | contact line |
| 49 | intersecting point |

What is claimed is:

1. A planetary gear unit, comprising:
a central axis;
a first sun gear rotatable about the central axis;
a second sun gear rotatable about the central axis;
at least one first set of planet gears in mesh with the first sun gear;
at least one second set of planet gears in mesh with the second sun gear;
a first angular bearing including:
 a first inner ring connected to the first sun gear;
 a first outer ring; and,
 at least one first ball disposed between the first inner and outer rings;
a second angular bearing including:
 a second inner ring connected to the second sun gear;
 a second outer ring; and,
 at least one second ball disposed between the second inner and outer rings; and,
a combined radial/axial bearing including:
 a first portion in contact with and between the first and second sun gears in a direction parallel to the axis; and,
 a second portion in contact with and between the first and second sun gears in a direction orthogonal to the central axis, wherein:
a first contact line for the at least one first ball, with respect to the first inner race:
 passes through:
  respective points of contact between the at least one first ball and the first inner and outer rings; and,
  a center of the at least one first ball and the central axis; and,
 forms a first acute angle with respect to a line orthogonal to the central axis;
a second contact line for the at least one second ball, with respect to the second inner race:

intersects the first contact line at the central axis;
passes through:
- respective points of contact between the at least one second ball and the second inner and outer rings; and,
- a center of the at least one first ball and the central axis; and, forms a second acute angle with respect to the line orthogonal to the central axis, the first sun gear is mounted in the planetary gear unit by means of the first angular ball bearing in a manner allowing rotation of the first sun gear about the central axis; and, the second sun gear is mounted in the planetary gear unit by means of the second angular ball bearing in a manner allowing rotation of the second sun gear about the central axis.

* * * * *